Figure 1:
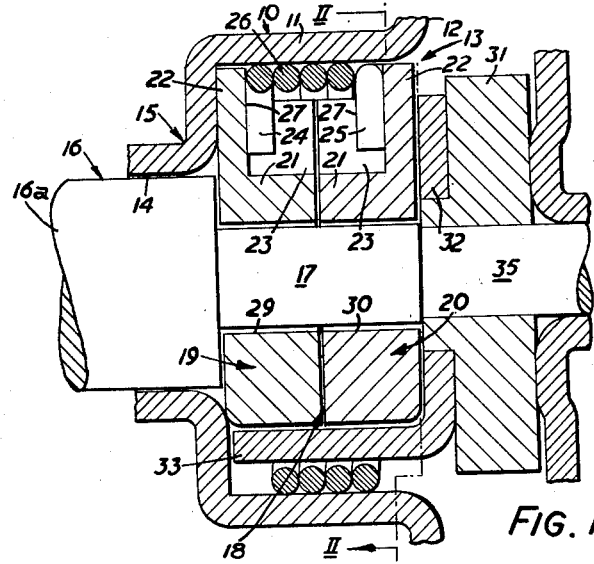

Oct. 3, 1961  A. C. HASELER ET AL  3,002,594
COIL SPRING MEANS FOR RELEASABLY COUPLING
TWO RELATIVELY ROTATABLE MEMBERS
Filed Oct. 29, 1957

INVENTORS

ARTHUR CEDRIC HASELER
GILBERT WHITRIDGE LACON
BY Irvin S. Thompson
ATTORNEY

United States Patent Office 3,002,594
Patented Oct. 3, 1961

3,002,594
COIL SPRING MEANS FOR RELEASABLY COUPLING TWO RELATIVELY ROTATABLE MEMBERS
Arthur Cedric Haseler and Gilbert Whitridge Lacon, Birmingham, England, assignors to Wilmot-Breeden Limited, Birmingham, England
Filed Oct. 29, 1957, Ser. No. 693,054
Claims priority, application Great Britain Nov. 2, 1956
17 Claims. (Cl. 192—8)

This invention relates to coil spring means for releasably coupling two relatively rotatable members of the type in which the spring has radially turned ends or legs capable of relative angular movement about the axis of the spring by means of an actuating member to effect the radial expansion or contraction of the spring upon which the coupling or uncoupling of the driven member of the coupling means to or from the driving member of the latter depends. Coil spring coupling means of the foregoing type find particular though not exclusive application in manually operated mechanisms, for example vehicle window regulators.

In one known construction of the foregoing type of coupling means utilising a coil spring of the internal expanding type the spring is carried within the driving member of the coupling means and has its angularly separated and radially inwardly turned ends or legs projecting into a wide radial gap or slot formed in a drum which is fixed upon or integral with the actuating member of the coupling means so that one of such legs lies towards each side of the gap while a portion of the driven member of the coupling means projects longitudinally of the drum and into the space between the radial legs of the spring. One of the disadvantages of this arrangement in practice is that the radial legs of the spring are not supported on their inner sides and consequently the pressure of the sides of the gap or slot on the spring legs is exerted on the latter as a force tending to bend the legs with the result that spring failure is likely to occur at a rather low torque loading of the coupling means.

The main object of the present invention is to overcome this disadvantage and to provide an improved construction of coil spring coupling means which, for a given material utilisation, will withstand considerably greater loads than the known construction of coupling means. A further object is to provide a coil spring coupling means which is simple and economical in manufacture and moreover one which is capable of partial pre-assembly to a stage in which it may be held in stores whence it is rapidly available for completion to suit any particular application for which it is required.

According to the invention the spring of a coil spring coupling means of the type first set forth has its radially turned ends or legs received in a member or drum split along a plane normal to the axis of the spring, each half of the member or drum being formed with a radial slot which closely embraces on both sides the radial leg of the spring received therein and with a separate gap to receive a portion of the driven member of the coupling means projecting longitudinally of the member or drum. By reason of the foregoing arrangement the spring legs are closely held in the slots which are expressly formed to receive them, as a result of which the pressure exerted by the actuating member on the spring legs is taken in shear, thereby enabling advantage to be taken of the considerably higher shear strength of the spring wire.

The two halves of the member or drum are preferably both separate from the actuating member of the coupling means but are associated with the actuating member so as to be rotationally coupled thereto. Preferably the coupling is such that there is angular lost motion between the actuating member and the half or halves of the member or drum. For this purpose a portion of the actuating member which projects longitudinally of the member or drum is adapted to enter gaps or openings in the halves thereof of sufficient length in a rotational direction to permit a given degree of angular movement of the actuating member relatively to the halves of the member or drum before the latter turn therewith.

Preferably the halves of the member or drum, which are each in the form of a substantially circular disc-like body having a circumferential flange at one end to form an abutment for the respective end coil of the spring with the body lying within the coils of the spring to form an axial guide, has the inner radial face of the circumferential flange shaped as a single-turn helix the angle of which substantially matches that of the spring so that the latter is maintained in the form of a true helix coaxial with the driving member of the coupling means.

The aforesaid radial slot in each half of the member or drum is preferably disposed at the inner end of the helix and is of such depth that a radial shoulder is formed at said inner end whereby any load imposed on the spring by said half of the member or drum in a direction tending to radially expand the spring is transmitted substantially end-on to the spring coil.

Figure 2:
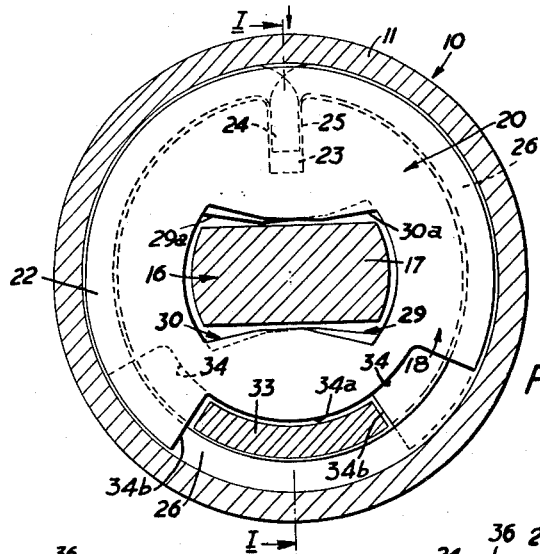
Figure 3:
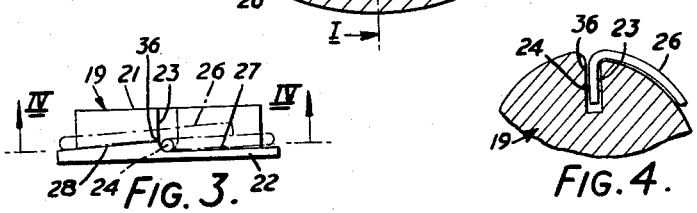
Figure 4:
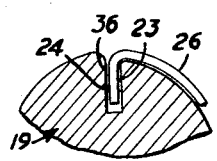

A mode of carrying the invention into effect in connection with a regulator for the sliding windows of motor vehicles will now be described, by way of example, with reference to the accompanying drawings, in which:

FIGURE 1 illustrates diagrammatically the coil spring coupling means in axial section on the line I—I of FIGURE 2, the coupling means being shown in the position in which the driven member is coupled to the driving member, FIGURE 2 is an end view of the coupling means, partly in section, substantially on the line II—II of FIGURE 1, FIGURE 3 is a side elevation, on a smaller scale, of one of the halves of the member or drum shown in FIGURES 1 and 2, a portion of the cltuch spring being indicated in broken lines, and FIGURE 4 is a broken sectional view on the line IV—IV of FIGURE 3.

Referring to the drawings, the coupling means 10 shown therein forms part of a window regulator and is of the kind in which a coil spring of the internally expanding type is utilised. The coupling means 10 comprises a cuplike housing 11 peripherally flanged, as shown at 12, at its open end 13 to enable it to be mounted in fixed relationship to the door panelling, not illustrated, of the vehicle and formed with a central opening 14 in its closed end or bottom 15 to receive the actuating spindle 16, The latter has a portion 17 of its length lying within the cup-like housing 11 formed to non-circular section to enable it to have rotational driving connection with a drum 18 loosely mounted thereon. In the embodiment chosen for description the portion 17 is of substantially rectangular cross-section. The loose drum 18 is itself made in two halves 19, 20 identical with each other, each half being in the form of a substantially circular disc-like body 21 with a circumferential flange 22 at one end and having a narrow radial slot 23 formed in the body and of sufficient width to receive a radially inwardly turned end or leg 24, 25 of the coil spring 26 of the coupling means 10 and embrace it closely on both sides.

Each slot 23 is closed at one end, i.e. at the flanged end of the body 21, as shown in FIGURE 3. The inner radial face 27 of the flange 22 is preferably shaped as a single turn helix the angle of which substantially matches the helix angle of the spring 26, as shown at 28, so that the spring is maintained in the form of a true helix coaxial with the housing 11.

As shown in FIGURE 1, to compose the drum 18 the two drum halves 19, 20 are slipped on to the actuating spindle 16 with their circumferential flanges 22 away from each other, the drum halves having central openings 29, 30 therein of sufficient dimensions to receive the aforesaid non-circular section 17 of the spindle. The coil spring 26 nests within the housing 11 and lies between the end flanges 22, 22 of the composite drum 18, the radially inwardly turned ends or legs 24, 25 of the spring lying within the respective radial slots 23, 23 of the drum halves 19, 20. In the embodiment illustrated sliding movement of the window is effected by means of a pinion 31 secured to a driving plate 32, the latter having a peg 33 in the form of an arcuate flange projecting into the housing 11. Substantially opposite the narrow radial slot 23 of each drum half 19, 20 the latter is formed with a more or less arcuate gap 34, the two arcuate gaps 34, 34 coming into substantial registration over at least a portion of their lengths, as shown at 34a in FIGURE 2, when the two halves are put together to compose the drum and receiving within the registering portion of the arcuate gaps the peg 33 of the pinion driving plate 32 of the window regulator.

In the application of the invention being described the pinion driving plate 32 constitutes the driven or output member of the coupling means 10 while the fixed brake member is the stationary housing 11. The extremity 35 of the actuating spindle 16 beyond the non-circular section 17 of the latter projects out of the flanged open end 13 of the housing 11 and is of circular section, the pinion 31 of the window regulator and its attached driving plate 32 being freely mounted thereon with the peg 33 of the latter projecting into the registering portions 34a of the arcuate gaps 34, 34 in the drum halves 19, 20. The pinion 31 operates mechanism, not illustrated, for opening and closing the window, the inner end 16a of the actuating spindle having an operating handle, not illustrated, secured thereto to disengage the coupling means and subsequently rotate the pinion in the chosen direction. With the parts in their normal positions, shown most clearly in FIGURE 2, the coil spring 26 is in frictional gripping contact with the stationary housing 11, and the drum 18, and consequently the pinion driving plate 32, is accordingly braked or coupled thereto. However, the arrangement is such that initial rotational movement of the actuating spindle 16 in either direction by means of the handle causes relative angular movement between the drum halves 19, 20 and so relative movement between the radially inwardly turned ends or legs 24, 25 of the spring 26, in a sense to contract the spring and thereby release the pinion driving plate 32 from the stationary housing 11 and permit rotation of the pinion driving plate to raise or lower the window under further rotational movement of the actuating spindle. This is achieved in the following manner:

The central openings 29, 30 in the drum halves 19, 20 are of greater dimensions in an angular sense than the non-circular section 17 of the spindle 16 received therein, as shown clearly in FIGURE 2, and consequently there is angular lost motion between such section and the drum halves. Moreover the central openings 29, 30 are slightly out of register with each other so that the spindle-engaging faces 29a, 30a of each drum half 19, 20 have a lead or lag with respect to those of the other drum half when the two drum halves are under the torsional loading of the spring 26. A substantially similar lead and lag is provided between the end faces 34b, 34b of the arcuate gaps 34, 34 in the drum halves 19, 20 so that pressure by the peg 33 of the pinion driving plate 32 against an end face of the gap due to the weight of the window tends to expand the coil spring 26 into firmer frictional engagement with the housing 11.

The two-part construction of drum according to the invention enables the use of springs 26 having their legs 24, 25 in any angular relationship, for example aligned with each other as in the embodiment illustrated, instead of angularly separated by an amount which has hitherto been automatically fixed by the width of the peg 33 of the pinion driving plate 32. It also results in reduced loading on the end of the peg 33. Further, due to the fact that the drive between the coil spring 26 and the pinion driving plate 32 is taken through the drum halves 19, 20, the peg 33 may if desired be made shorter than hitherto in that it no longer has to extend from the leg 25 to the other leg 24 of the spring 26. As a result the necessity for "handed" springs which sometimes arises is avoided.

It has moreover been found in practice that the construction according to the invention enables the backlash between the driving and driven members 11, 32 of the coupling means 10, which inevitably occurs in coupling means dependent upon the expansion and contraction of a coil spring, to be controlled and kept at a minimum. It will be seen that assembly of the actuating spindle 16 with the otherwise pre-assembled regulators can be left to a final stage which is a point of considerable practical importance.

A further feature of the invention is that the helical form of the inner radial face 27 of the flange 22 of each of the drum halves 19, 20, and the disposition of the slot 23 in relation to such helical form, permits any load imposed by the driving peg 33 through either of the drum halves 19, 20 on the spring 26, in a direction tending to radially expand the latter and increase the friction or coupling effect, to be transmitted substantially end-on to the spring coil. This will be understood from a consideration of FIGURES 3 and 4 which clearly show that the disposition of the slot 23 at the inner end of the helix on the radial face 27 and the depth of the slot 23 are such that a radial shoulder 36 is formed at such inner end. In consequence of this arrangement the shoulder 36 abuts the end coil of the spring 26 at a point where the latter is bent inwardly to form the leg 24 with the result that the aforesaid load is transmitted end-on to the spring coil in a circumferential direction by the shoulder, thereby still further increasing the load at which any given coupling means will collapse.

In order to provide each of the drum halves 19, 20 with spindle-engaging faces 29a, 30a of considerable length, the central openings 29, 30 in the respective drum halves are preferably of substantially hour-glass shape, as shown in FIGURE 2. This arrangement permits the necessary angular lost motion between the non-circular section 17 of the spindle and the drum halves 19, 20 whilst avoiding substantially line contact therebetween.

We claim:

1. Coil spring coupling means comprising two coaxial relatively rotatable members, a drum mounted coaxially with said members and formed as two axially separate parts, a helical spring carried coaxially by the drum with the ends of the spring engaged respectively by said two separate parts of the drum, a first of said members having a surface in frictional engagement with the convolutions of said spring when the latter is in a free condition, the other of said members being in driving engagement with said drum whereby a torque applied by said other member in one direction applies a torque to said spring whereby the grip of the latter on said first member is increased, and an actuating member rotatably mounted coaxially with said members and separate from but rotationally coupled to said drum with a degree of angular lost motion therewith whereby a torque applied by said actuating member in the opposite sense to said one direction applies a torque to said spring tending to decrease the grip of the latter on said first member.

2. Coupling means according to claim 1, wherein said helical spring is formed with radially turned ends and said parts of the drum are formed with radial slots in which said ends of the spring are respectively received and closely embraced on both sides.

3. Coupling means according to claim 2, wherein said radially turned ends of said spring are disposed in alignment with each other.

4. Coil spring coupling means comprising two coaxial relatively rotatable members, a drum mounted coaxially with said members and formed as two similar axially separate parts which are mutually inverted in the axial sense, a helical spring carried coaxially by the drum so as to surround the latter with the ends of the spring engaged respectively by said two separate parts of the drum each of which is in the form of a substantially circular disc-like body having at its outer end a circumferential flange an inner radial face of which is shaped as a single turn helix the angle of which substantially matches that of the spring to maintain the latter in the form of a true helix, a first of said members having a surface in frictional engagement with the convolutions of said spring when the latter is in a free condition, the other of said members having a portion which enters into driving engagement with said drum whereby a torque applied by said other member in one direction applies a torque to said spring whereby the grip of the latter on said first member is increased, and an actuating member rotatably mounted coaxially with said members and separate from but rotationally coupled to said drum with a degree of angular lost motion therewith whereby a torque applied by said actuating member in the opposite sense to said one direction applies a torque to said spring tending to decrease the grip of the latter on said first member, said spring being formed with radially inturned ends and each of said drum parts having a radial slot at the inner end of the helix of the circumferential flange thereof in which said ends of the spring are respectively engaged, the depth of the radial slots being such that a radial shoulder is formed on each of said peripheral flanges whereby any load imposed on said spring in a direction tending to expand the latter radially is transmitted substantially end-on to the end coils of said spring.

5. Coil spring coupling means comprising two coaxial relatively rotatable members, a drum having first and second axially separate parts mounted coaxially with said members, a helical spring carried coaxially by the drum with the ends of the spring engaged respectively by said first and second drum parts, a first of said members having a surface in frictional engagement with the convolutions of said spring when the latter is in a free condition, the other of said members having a portion which enters into driving engagement with said drum parts whereby a torque applied by said other member in one direction applies a torque to said first drum part and a torque applied by said other member in the opposite direction applies a torque to said second drum part so that in each case a torque is applied to said spring whereby the grip of the latter on said first member is increased, and an actuating member rotatably mounted coaxially with said members and separate from said drum parts but rotationally and selectively coupled to each of these latter with a degree of angular lost motion therewith by a portion of said actuating member which portion projects longitudinally of the drum through said first and second parts thereof whereby a torque applied by said actuating member in said one direction is transmitted to said second drum part only and a torque applied by said actuating member in the opposite direction is applied to said first drum part only so that in each case a torque is applied to said spring tending to decrease the grip of the latter on said first member.

6. Coupling means according to claim 5, wherein said first and second drum parts are formed with substantially central shaped openings of sufficient length in a rotational direction to permit said degree of lost motion.

7. Coupling means according to claim 6, wherein said axially projecting portion of said actuating member is of non-circular section and the substantially central openings in said drum parts are slightly out of register with each other so that the faces of each drum part which are engaged respectively by said portion of the actuating member have a lead or lag with respect to those of the other drum part when both drum parts are under the torsional loading of said spring.

8. Coupling means according to claim 7, wherein said portion of said actuating member is of substantially rectangular cross-section, and the substantially central openings in said drum parts are of substantially hour-glass shape.

9. Coupling means according to claim 8, wherein said actuating member has a further portion which projects axially from said drum, said other member being mounted on this axially projecting further portion so as to be freely rotatable thereon.

10. Coupling means according to claim 9, wherein said portion of said other member projects therefrom in the axial direction and engages with angular lost motion in gaps formed in said drum parts, a substantially similar lead and lag being provided between the end faces of such gaps and said projecting portion of the other member as is provided between said non-circular section of the actuating member and the corresponding faces of the substantially central openings in said drum parts.

11. Coupling means according to claim 5, wherein said helical spring is formed with radially turned ends, and said parts of the drum are formed with radial slots in which said ends of the spring are respectively received and closely embraced on both sides.

12. Coupling means according to claim 11, wherein said radially turned ends of said spring are disposed in alignment with each other.

13. Coupling means according to claim 12, wherein said helical spring surrounds both parts of said drum and said first member has an internal cylindrical surface in said frictional engagement with the spring.

14. Coupling means according to claim 5, wherein said drum parts are similar and mutually inverted in the axial sense and each of said drum parts is in the form of a substantially circular disc-like body having a circumferential flange at its outer end, the end coils of said helical spring respectively abutting the circumferential flanges of said drum parts.

15. Coupling means according to claim 14, wherein the inner radial face of each of said circumferential flanges is shaped as a single turn helix the angle of which substantially matches that of the spring, whereby the latter is maintained in the form of a true helix.

16. For sliding windows, a regulator incorporating coupling means to act as a brake and comprising a brake member adapted to be fixedly mounted and an output member capable of being rotationally coupled to, and released from, said brake member and coaxial therewith, a drum mounted coaxially with said output and brake members and formed as two axially separate parts, a helical spring carried coaxially by the drum with the ends of the spring engaged respectively by said two separate parts of the drum, said brake member having a surface in frictional engagement with the convolutions of said spring when the latter is in a free condition and said output member being rotationally coupled to both of said drum parts with a degree of angular lost motion therewith, and an actuating member rotationally mounted coaxially with said output and brake members and rotationally coupled to both of said drum parts with a degree of angular lost motion therewith whereby rotational movement of said actuating member initially effects release of said output member from said brake member and then produces rotational movement of said output member.

17. A regulator according to claim 16, wherein said helical spring surrounds both of said separate parts of said drum, and said brake member has an internal cylindrical surface in said frictional engagement with the spring.

References Cited in the file of this patent

UNITED STATES PATENTS

| | | |
|---|---|---|
| 1,614,629 | Quick et al. | Jan. 18, 1927 |
| 1,937,626 | Briggs | Dec. 5, 1933 |
| 1,997,646 | Miller | Apr. 16, 1935 |
| 2,145,666 | Roethel | Jan. 31, 1939 |
| 2,175,473 | Landrum | Oct. 10, 1939 |
| 2,219,877 | Starkey | Oct. 29, 1940 |
| 2,888,843 | Hollis | June 2, 1959 |